United States Patent [19]

DiMartino

[11] 3,972,439

[45] Aug. 3, 1976

[54] HORIZONTAL CONNECTOR FOR SHIPPING CONTAINERS

[76] Inventor: John M. DiMartino, 72 Lumur Drive, Sayville, N.Y. 11782

[22] Filed: June 5, 1974

[21] Appl. No.: 476,380

[52] U.S. Cl. .......................... 214/10.5 R; 24/221 R; 105/366 R; 220/1.5
[51] Int. Cl.² .......................................... B65G 1/14
[58] Field of Search ............ 24/211 P, 230 AS, 212, 24/81 SF; 403/292; 26/81 E; 220/1.5; 312/111; 105/366 R; 294/67 R, 67 DA

[56] References Cited
UNITED STATES PATENTS

| | | | |
|---|---|---|---|
| 2,473,388 | 6/1949 | Rambo | 403/292 |
| 2,547,502 | 4/1951 | Smith | 294/67 DA |
| 2,622,298 | 12/1952 | Macedo | 24/230 AS |
| 3,052,941 | 9/1962 | Abolins | 24/221 R |
| 3,078,115 | 2/1963 | Harlander | 294/81 SF |
| 3,093,031 | 6/1963 | Damm | 24/230 AS |
| 3,262,729 | 7/1966 | Willison | 295/81 SF |
| 3,578,374 | 5/1971 | Glassmeyer | 24/81 E |
| 3,599,824 | 8/1971 | Pneuman | 24/81 E |
| 3,752,511 | 8/1973 | Racy | 403/292 |

FOREIGN PATENTS OR APPLICATIONS

| | | | |
|---|---|---|---|
| 10,126 | 12/1955 | Germany | 24/230 AS |

Primary Examiner—Bernard A. Gelak
Attorney, Agent, or Firm—Robert A. Kelly

[57] ABSTRACT

Means for the releasable horizontal coupling of shipping containers at their standard corner fittings is provided by a horizontal connector having a pair of parallel spaced-apart planar exterior walls, a pivot housing extending transversely outward from each of the walls, and a separately operable chuck pivotally mounted for rotation in each pivot housing. Each chuck includes a latching surface which is first engaged in a corner-fitting recess of a container and then urged to gather a one of the planar walls into flush contacting engagement with the facing vertical surface of the corner fitting. Four connectors are used to couple two container modules into a composite structure capable of transmitting both tension and compression forces between the modules sufficient to make a single beam of the connected modules, which beam can be moved by standard container handling equipment. The horizontal connector is adapted to use at both the top corner fittings and the bottom corner fittings.

12 Claims, 12 Drawing Figures

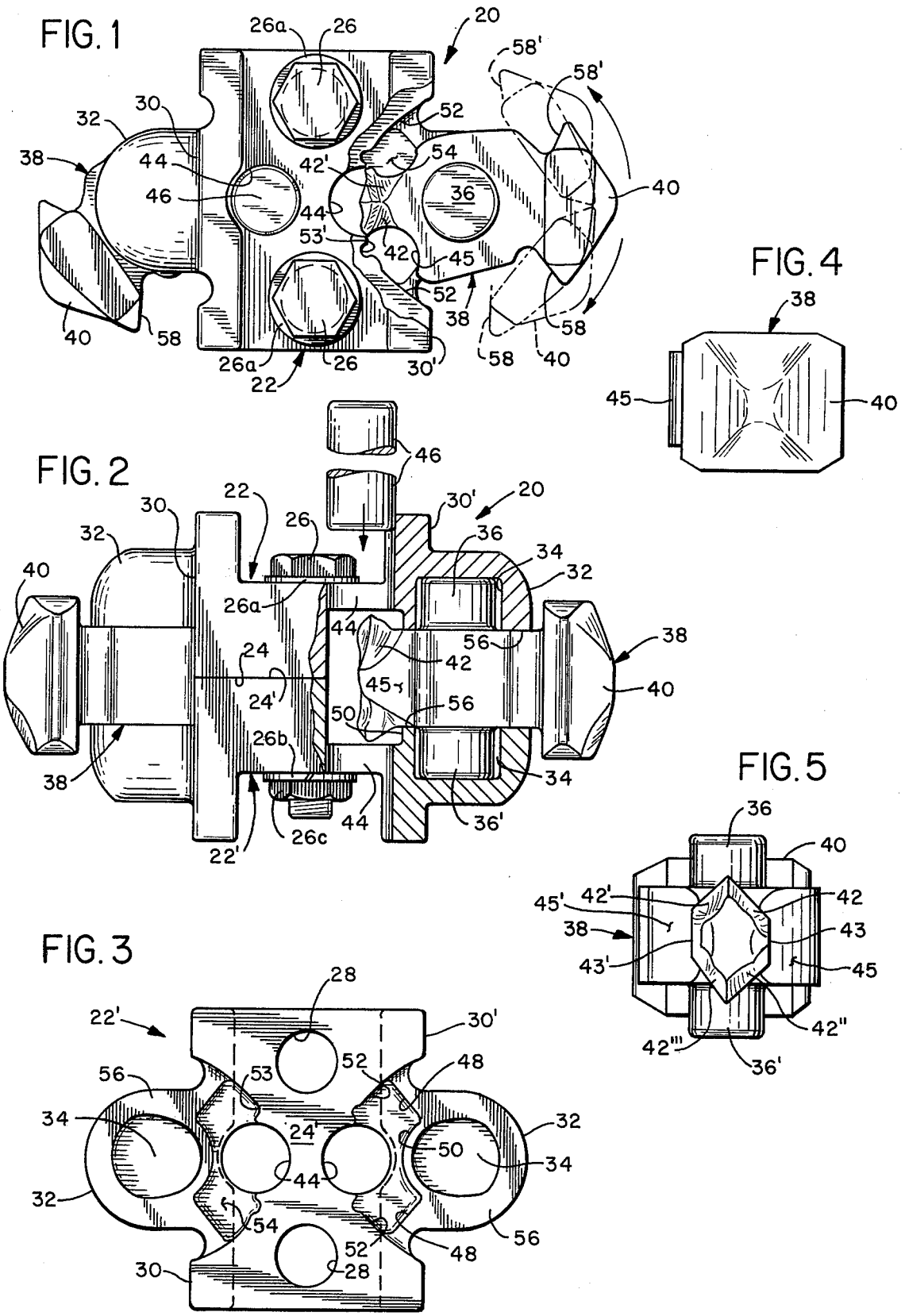

HORIZONTAL CONNECTOR FOR SHIPPING CONTAINERS

BACKGROUND OF THE INVENTION

In recent years the use of shipping containers has virtually revolutionized the freight handling industry, especially for international shipments, because of the convenience and economic advantages accruing from the use of weatherproof containers of rectangular shape which are capable of storing a number of unit items, whether packages or bulk material, while confining and protecting the contents from loss or damage during transport as a unitary load that can be separated from the means of transport and transshipped without rehandling the contents.

In this connection, standardized containers (I. S. O. standard) and standardized handling equipment have been developed concurrently to reap the maximum benefit from this development. At this date, there is a world-wide body of carriers, shippers, leasing companies, repair facilities, and manufacturers who are involved in international intermodal transportation systems and who have an economic stake in assuring that the containers transported or serviced by them should be in compliance with established standards. These standards are based upon a container of 40-foot length, and provide for use of shorter modules which can be arranged to occupy the space provided for a 40-foot container in the hold of a ship or other intermodal transport.

General economic considerations as well as the increased use of modular containers now makes it even more desireable to reduce the actual manipulation of the shorter modules by releasably coupling two or more modules together to form a structurally stable assembly that can be handled with standard equipment designed for use with the 40-foot container.

As is well known in the art, standard shipping containers or the type described have at each corner a corner fitting in which there is an orifice in each exterior face, each orifice opening into a common recess within the corner fitting.

Existing devices of the prior art for horizontal coupling of containers at their corner fittings are not completely satisfactory in that they generally lack any means for gathering the containers together during the act of coupling, are incapable of being selectively fastened to or disconnected from either one or both of two containers, and cannot be used at the top corner fitting as well as at the bottom corner fitting.

SUMMARY OF THE INVENTION

These and other drawbacks and disadvantages of the prior art devices for horizontally coupling containers, container modules, and the like in end-to-end and side-to-side assemblies are substantially eliminated in accordance with the present invention for releasable horizontal coupling of shipping containers at their abutting corner fittings wherein a connector of simple and rugged construction joins two containers with an independently and separately operable member penetrating into and gathering and latching with each recess of the abutting corner fittings of the adjacent containers.

According to the practice of this invention, my horizontal connector comprises a two-part body means having a pair of parallel spaced-apart planar side-wall members with a longitudinal axis of symmetry therebetween, each side of the axis of symmetry a pivotally mounted chuck means for removable penetration through an orifice into the recess of a corner fitting, and, a separate independent means for urging each chuck means into latching engagement with the interior of the recess while simultaneously gathering an exterior face of the corner fitting into flush contacting engagement with the facing one of the side-wall members. The means for urging includes a drive means for rectilinear movement acting on a cam surface of the chuck means.

A more thorough and complete understanding of the invention may be had by reference to the appended drawing when taken together with the description of the preferred embodiments.

BRIEF DESCRIPTION OF THE DRAWING

FIG. 1 is a plan view, in partial cutaway, section, and phantom, of a first embodiment of the connector adapted for manual operation without use of special tools.

FIG. 2 is an elevation view, in partial cutaway and section, of the embodiment of FIG. 1 showing each rotatable chuck in a neutral position.

FIG. 3 is a plan view of a body member of the embodiment of FIG. 1.

FIG. 4 is an end view showing only the latching head of the rotatable chuck of the embodiment of FIG. 1.

FIG. 5 is a rear elevation of the rotatable chuck of the embodiment of FIG. 1 as seen from the end opposite the latching head.

FIG. 7 is a plan view of the second embodiment operable by use of a spanner, socket wrench or the like.

DESCRIPTION OF THE PREFERRED EMBODIMENT

Figure 6:
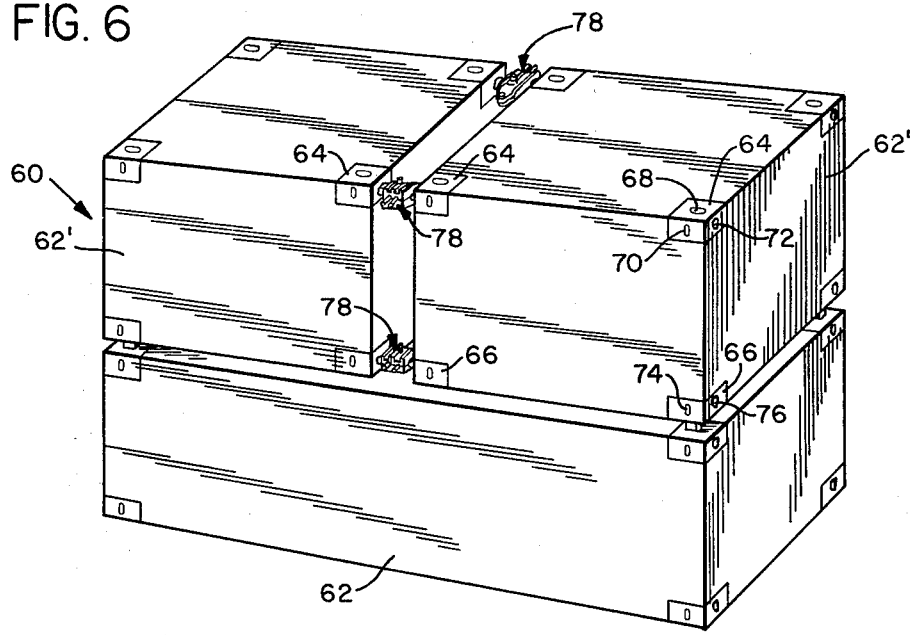
FIG. 6 is a general perspective view of two container modules horizontally coupled by a second embodiment of my connector at each of the abutting corner fittings to form a composite structure which is shown mounted on a standard container.

In the drawing, wherein like numerals refer to like components, FIG. 1 through FIG. 5 illustrate a first preferred embodiment of my invention which is adapted for manual operation without need for special tools, wrenches, or the like. Horizontal connector 20 has a body made up of two substantially identical body members 22, 22' which are symmetric with respect to a longitudinal axis and to a transverse axis. The connector is assembled with the mating surface 24, 24' of each of the body members in flush contact and fastened by bolts 26 provided with washers 26a, lock washers 26b and nuts 26c, the bolts 26 passing through two bolt holes 28 equally spaced apart from the transverse axis of symmetry on the longitudinal axis of symmetry. Each of the longitudinally extending parallel spaced-apart wall members 30, 30' has a pivot housing 32 extending outwardly along the transverse axis of symmetry. Each pivot housing includes a recessed pivot cup 34 which supports a one of cylindrical pivot pins 36, 36' of a rotatable chuck 38 having a latching head 40 on a first end thereof extending exterior to said pivot housing and a cam surface 42 at the other end thereof captive within the body of connector 20. An access opening 44 located on the transverse axis of symmetry is provided in each body member for the insertion therethrough of a cylindrical drive rod 46 engageable with cam surface 42 to cause rotation of the chuck to a latching position as will be described hereinafter. When drive rod 46 is fully inserted in access opening 44, a first portion of its cylindrical surface engages with cylindrically concave surface 45 of chuck 38 while a second portion forms part of a wall surface of an inner cavity of assembled connector 20, within which the cam surface end of chuck 38 is rotationally positionable, said cavity having end walls 48, 49', a convex side wall 50, a generally concave side wall 52 contiguous with the cylindrical surface of drive rod 46 and a one of side walls 30, 30', and a planar surface 54 parallel to and spaced apart from mating surface 24, 24'. When drive rod 46 is removed from access opening 44, the inner cavity includes the volume of access opening 44 between the extension of each planar surface 54 previously occupied by the drive rod. Each of end walls 48, 48' and convex side wall 50 has an upper termination at its intersection with plane surface 56 within which pivot cup 34 is recessed, said plane surface substantially parallel to and spaced apart from mating surface 24, 24'.

Referring now to FIG. 1 drive rod 46 is shown fully inserted in access opening 44, causing chuck 38 to assume the position shown at the left hand side of the figure with latching surface 58 substantially parallel to wall member 30. The right hand side of FIG. 1 shows chuck 38 in a neutral position, midway between two alternate latching positions, indicated by the phantom outlines of latching head 40. Chuck 38 must be cocked by rotation from the neutral position a short distance in the direction of the clockwise arrow prior to the insertion of drive rod 46 in access opening 44 so as to engage cam surface 42 and urge chuck 38 to the latching position with latching surface 58 substantially parallel to wall member 30'.

Referring now to FIG. 6 showing a block 60 of stacked shipping containers, each container 62, 62' has at its corners a standard I. S. O. corner fitting, designated as top corner fittings and bottom corner fittings. Top corner fitting 64 is different from bottom corner fitting 66 in that, although both types of corner fittings have an elongate orifice 68 in the horizontally disposed surface, top corner fitting 64 has a generally oval orifice 70 in its side face and a shield shaped orifice 72 in its end face while botom corner fitting 66 has a generally oval shaped orifice 74 in its side face and a substantially identical oval shaped orifice 76 in its end face. All the orifices in a corner fitting open into a common recess in the fitting.

Because of the difference in shape of orifice 72 and orifice 76, and because it is contemplated to use the horizontal connector of my invention to horizontally connect containers of the type described at either their top corner fittings or their bottom corner fittings as required, I provide latching head 40 with a second latching surface 58' and rotatable chuck 38 with a corresponding cam surface 42' to be acted upon by drive rod 46 to urge latching surface 58' to its latching position, as shown by the phantom position at the right hand of FIG. 1. Because connector 20 can be used interchangeably at top corner fittings as well as at bottom corner fittings, and since it is preferred that the latching head 40 faces towards the exterior side of a corner fitting rather than towards an interior side in order to benefit from the nonsymmetric location of the orifices in the corner fitting, I also provide an additional concave surface 45' as well as cam surface 42'' and a cam surface 42''' so that inversion of connector 20 will permit the desired preferred orientation of latching surface 58 or latching surface 58' when drive rod 46 is inserted downwardly in access opening 44.

The dimensions of pivot housing 32, chuck 38, latching head 40, and latching surfaces 58 and 58' are determined, as is understood by those skilled in the art, with special reference to the dimensions of orifice 72 and orifice 76, so that latching head 40 and pivot housing 32 can penetrate either orifice 72 or orifice 76, interchangeably, and after penetration chuck 38 can be urged to a latching position with the appropriate latching surface engaged with the inner surface of the recess therebehind so as to gather a one of wall members 30, 30' into flush contact with the vertical face of the corner fitting.

In order to facilitate the cocking of chuck 38 and also to assure that the chuck does not become uncocked during insertion through an orifice of a corner fitting, pivot cup 34 is made to have a prolate cross-section extended in the direction of the transverse axis of symmetry, thereby allowing pivot pins 36, 36' to be positioned within pivot cup 34 at the side closest to a one of side-wall members 30, 30' during cocking, causing projecting spur 43, adjacent cam surface 42, to wedge into notch 53 in concave side wall 52, which wedging prevents inadvertent rotation of chuck 38 from the cocked position until pivot pins 36, 36' have been urged towards the opposite side of pivot cup 34 by the action of drive rod 46 acting on cam surface 42.

A second spur 43' and a second notch 53' are provided to allow use of connector 20 in the inverted position, as heretofore described.

As a consequence of the gathering action of each chuck 38 while it is being urged into latching position by a drive rod 46 acting on a cam surface 42, each of the wall members 30, 30' is forced into flush contact with the abutting end face of a corner fitting of the horizontally adjacent containers being coupled together.

The complete coupling between a pair of containers is made with four connectors, one at each corner fitting. First, each one of the connectors is mated with a separate corner fitting and a drive rod inserted to urge the proper latching surface to its latching position. Then, the two containers are brought together so that a cocked chuck of each connector enters through an appropriate orifice into the recess therebehind. The remaining drive rods are then inserted. This sequence results in a structure having a pair of adjacent containers, releasably coupled with a connector 20 at each of the abutting corner fittings, with each pivot housing penetrating an orifice, with each wall member in flush contact with an end face of a corner fitting, and with an appropriate latching surface urged against an inner surface of each recess. The horizontal couple so formed can transmit both tension and compression forces between the containers of magnitudes sufficient to make a single beam of the connected containers.

When it is desired to uncouple the containers, one or both of the drive rods is withdrawn from each of the connectors. Then, the action of separating the containers horizontally causes rotation of those chucks that have had their drive rods removed. The rotation continues until there is no longer an interaction between the chuck and orifice, allowing complete removal of the chuck from the orifice.

Referring now to the remaining figures of the drawing starting with FIG. 6, wherein the two upper containers are coupled together to form a beam using another preferred embodiment of my invention. In this second embodiment, horizontal connector 78 has a rotatable chuck 80 with a latching head 82 having a single latching surface 84, the latching head adapted to forming a coupling interchangeably at a top corner fitting 64 or a bottom corner fitting 66, as will be explained hereinafter.

Figure 10:
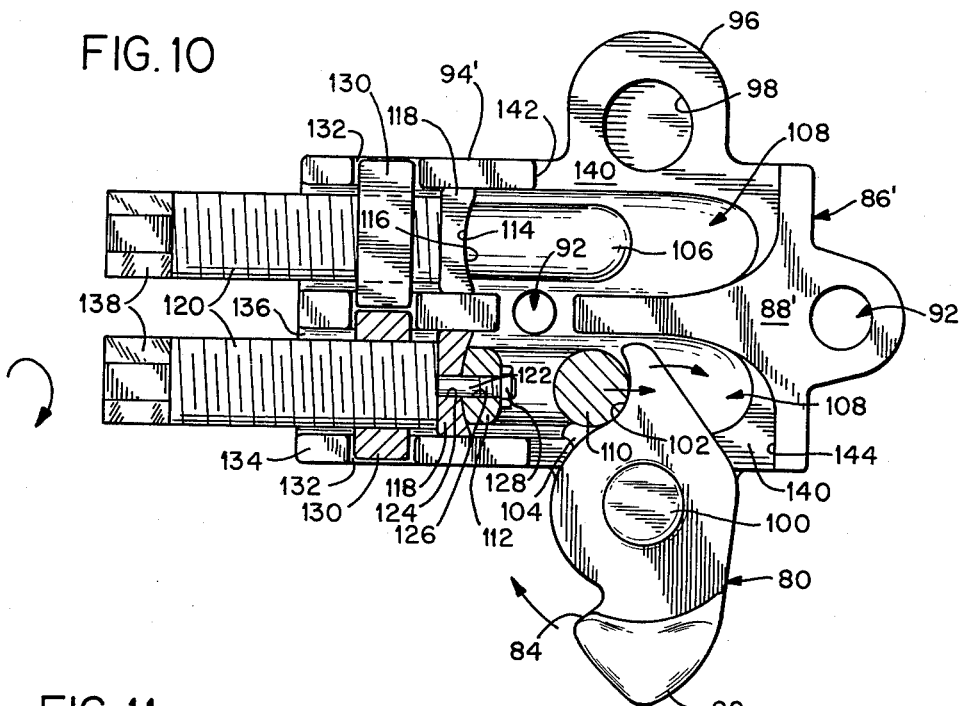
FIG. 10 is a plan view of the lower body member of the connector of FIG. 7 showing details of the chuck-drive mechanism in partial section.
Figure 11:
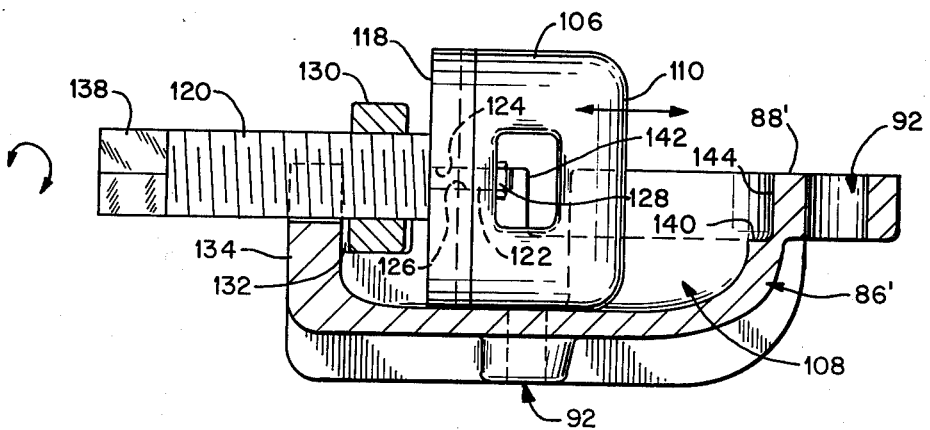
FIG. 11 is a sectional elevation of the lower body member of the connector of FIG. 7 showing further details of the chuck-drive mechanism mounted therein.

Connector 78 has a body made up of two substantially identical body members 86, 86' which are symmetric with respect to a longitudinal axis. The connector is assembled with the mating surface 88, 88' of each of the body members in flush contact and fastened by bolts 90 provided with washers 90a, lock washers 90b, and nuts 90c, the bolts 90 passing through two bolts holes 92 spaced apart along the longitudinal axis of symmetry. Each of the longitudinally extending parallel spaced apart planar side-wall members 94, 94' of a body member has a pivot housing 96 extending outwardly transverse to the longitudinal axis of symmetry. Pivot housing 96 includes a recessed pivot cup 98 which supports a one of opposed pivot pins 100, 100' of a rotatable chuck 80 having a latching head 82 on a first end thereof extending exteriorly to said pivot housing of the assembled connector and a cam surface 102 captive within the body of connector 78. Cam surface 102, extending substantially parallel to the axis of pivot pins 100, 100°, is cylindrically concave and is defined by that portion of the side surface of chuck 80 which is included between outstanding ear 104 and the end of chuck 80 most distant from latching head 82. Each of body members 86, 86' includes a pair of linear U-shaped channels 108, 108' open towards the mating surface, each of said channels parallel to the longitudinal axis of symmetry and spaced apart therefrom intermediate the longitudinal axis of symmetry and a one of the side-wall members. In each channel 108, 108' is a push block 106 supported for sliding reciprocation with its driving end member 110 of circular crosssection adapted to substantial mating engagement with cam surface 102 such that a linear movement of push block 106 causes a rotary movement of chuck 80, from the position illustrated in FIG. 10, in the direction of the arrows indicating movement, to a latching position, not shown. The engagement of driving end member 110 and cam surface 102 is such that when chuck 80 has been positioned in latching relationship, movement of push block 106 in the direction opposite to the arrow in FIG. 10 initiates unlatching by rotation of chuck 80 in the direction opposite the curved arrow.

Push block 106 has a generally D-shaped profile with a second end member 112 spaced apart from driving end-member 110. Convex surface 114 of end member 112 is in contacting engagement with concave surface 116 of follower 118, interposed between push block 106 and externally threaded stud 120. Stud 120 and push block 106 are swivelly connected by a threaded stem 122 which passes through an oversize smooth bore 124 in follower 118 and an oversize smooth bore 126 in end member 112 and is fastened by threaded nut 128 and secured by peening. Stud 120 is threadably engaged with internally threaded square nut 130 which is captively held in rectangular transverse slot 132 adjacent exterior end wall 134 of connector 78. End wall 134, which extends transversely between wall members 94, 94', has at its terminus formed with a mating surface 88, 88' a semicircular channel 136, open towards a mating surface 88, 88', which is aligned with each of U-shaped channels 108, 108' and leads into each of channels 108, 108'.

Each U-shaped channel 108, 108' is wider than the push block 106 mounted therein. This disparity in widths provides for a "floating action" of push block 106 in addition to its linear movement, whereby convex surface 114 can slide on concave surface 116, while push block 106 is being advanced linearly, so as to realign driving end-member 110 to follow the load as driving end-member 110 moves through an arcuate path in contact with cam surface 102 during rotation of chuck 80.

When connector 78 is assembled with body members 86, 86' in mating relationship, each semi-circular channel 136 forms a part of one of a pair of circular orifices through which extends the end of a stud 120 having hex head 138. In a like manner, each U-shaped channel 108 forms a part of one of a pair of inner cavities within which one end of a chuck 80 is positionably captive. Each inner cavity has an elongated opening through a one of side-wall members 94, 94', said opening bounded by plane surface 140, within which pivot cup 98 is recessed, and further bounded by transverse wall 142 and transverse wall 144.

Figure 7:
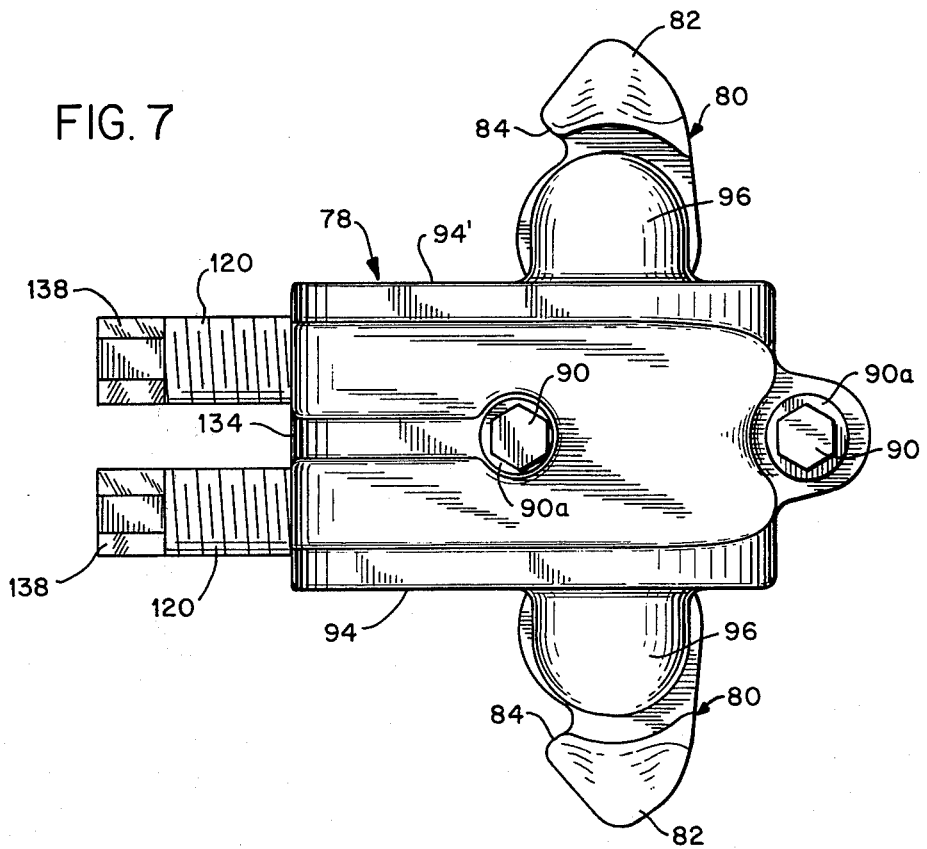
Figure 8:
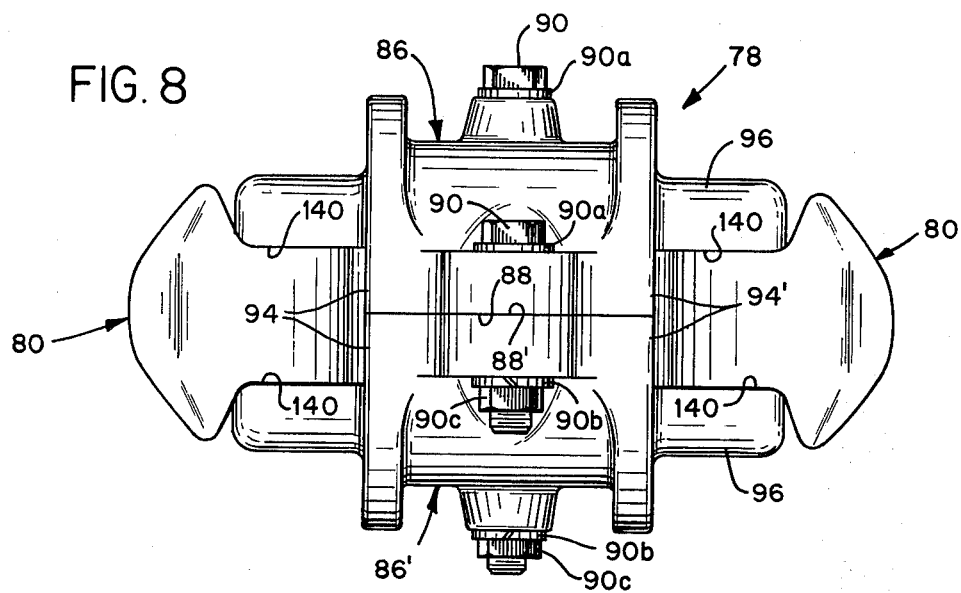
FIG. 8 is a right elevation view of the connector of FIG. 7.
Figure 9:
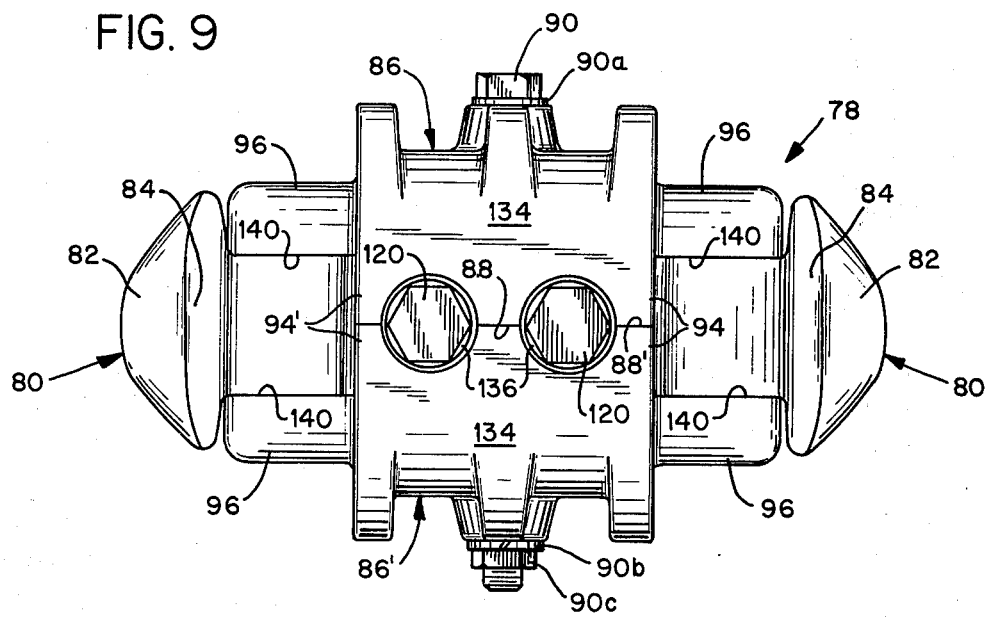
FIG. 9 is a left elevation view of the connector of FIG. 7.

The mode of operation of this second preferred embodiment of my invention can now be understood by reference to FIG. 6 through FIG. 12 of the drawing wherein FIG. 7 shows assembled connector 78 with rotatable chuck 80, in a position transverse to the longitudinal axis of symmetry, ready for insertion into the recess of a corner fitting through an orifice 72 or an orifice 76. When two half-length modular containers, such as containers 62' of FIG. 6, are to be coupled together so that they can be moved by standard container handling equipment and stacked on a standard container 62, four connectors of my invention are used, one at each of the abutting corner fittings. The steps in the operation generally follow the sequence: in turn, attach a connector 78 to each of four corner fittings of the containers to be coupled; bring the two containers together so that the unlatched chuck 80 of each connector 78 is within the recess of a corner fitting; and then position the unlatched chuck 80 into latching position until the end surface of each corner fitting is in flush contact with a one of side-wall members 94, 94'.

To attach a connector 78 to a corner fitting, as for example the corner fitting 64 of the right-hand container 62' of FIG. 6, latching head 82 of chuck 80 and pivot housing 96 are inserted through orifice 72 until side-wall member 94 is substantially flush with the end face of fitting 64. Threaded stud 120 is rotated, in the direction of the curved arrow of FIG. 10 by use of a suitable socket wrench or the like engaged with hex head 138, causing push block 106 to advance along channel 108 while urging cam surface 102 to cause rotation of chuck 80 to a latching position wherein latching surface 84 is firmly engaged with the interior of the recess of fitting 64 and side-wall member 94 has been urged into flush contact with the end surface of fitting 64. When all four connectors have been attached in this manner, one to a corner fitting, and the two containers have been brought together so that the unlatched chuck of each connector has penetrated an orifice with its latching head 82 within the recess therebehind, each chuck 80 is brought to a latching position by rotation of its threaded stud 120. The rotation of chuck 80 to its latching position exerts a gathering force which brings the surface of the corner fitting into flush contact with the side-wall member to create a coupling which will transmit substantial tension and compression forces between the containers so that the coupled modular containers can be handled as if they were a single container of standard size.

When it is desired to uncouple the containers, one or both of the rotatable chucks of each connector can be unlatched, by a reverse rotation of each threaded stud 120 until at least one chuck 80 is in the unlatched position thus permitting withdrawal through the orifice of a corner fitting when the containers are moved apart horizontally.

As is readily apparent from the foregoing descriptions, the two embodiments of my invention function in a like manner with the exception that the threaded stud and push block chuck-drive mechanism of the second embodiment provides a positive unlatching action which is not found in the first embodiment. At the same time, thus chuck-drive provides a selective control of the position of the latching surface, making it possible to use a rotatable chuck with a single latching surface as effectively in the end orifice of a top corner fitting as in the end orifice of a bottom corner fitting. Additionally, the selective control of the position of the latching surface also permits the use of this embodiment with containers having corner fittings whose wall thickness varies from standard and with containers which may be distorted or damaged.

Whereas, for illustration and explanation of the working of my invention, I have described the use of the connector of my invention for the releasable horizontal coupling of container modules in end-to-end configuration, it will be apparent to those skilled in the art that my connector can be used with equal facility for coupling containers in side-to-side configuration, since the side-opening orifices of the corner fittings are all identical. It is also obvious that my connector can be used to make up container-size structures from more than two modules, as such modules become available.

Figure 12:
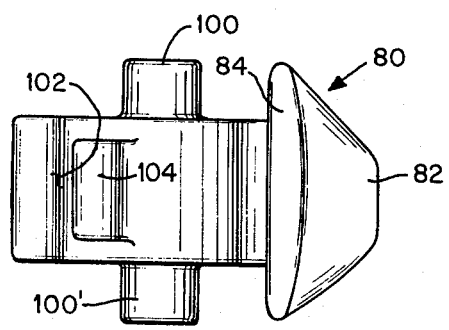
FIG. 12 is a side elevation view of the rotatable chuck of the connector of FIG. 7.

Since it is contemplated that the connectors of my invention be manufactured for minimum cost and long trouble-free life with easy repair, the preferred embodiments of my invention herein disclosed have been designed to use identical cast metal body members which require little or no machining and which can be assembled and disassembled quickly and simply without special tools. Similarly, the other components of my connector are designed for simplicity in fabrication and assembly. Reinforcement is provided and edges and corners have been rounded, as will be understood by those skilled in the art, to protect against excessive wear which can result from vigorous metal-to-metal contact during use. As an example of such reinforcement, since the latching head is most apt to suffer from impact during the operations of coupling and uncoupling, the latching head and the shank portion of the chuck are made of massive construction and the latching head is further provided with a frusto-pyramidal or frusto-conical crown, as shown in FIG. 4 and FIG. 12, to minimize the potential for damage. Additionally, to protect each pivot housing during coupling and uncoupling, the latching head includes upstanding flanges, best seen in FIG. 8 and FIG. 9. Conversely, it would be equally obvious to provide relief where the mass of metal or its cross-section can be reduced without sacrifice of function or strength.

Since the above and other non-inventive modifications of my invention will be obvious to artisans and other skilled in the art in the light of this disclosure, the scope of my invention should not be limited to the illustrated embodiments, which are disclosed herein as examples in conformace with the statute, but should be construed broadly in accord with the appended claims.

I claim:

1. A container connector for the independently releasable coupling of a pair of adjacent corner fittings of standard cargo containers, said corner fittings having an inner recess accessible through an elongated orifice on the facing surface thereof, said connector comprising:
    a. means forming a body having a first planar outside surface for placing said first outside surface against said facing surface of one corner fitting of a first of said shipping containers;
    b. said body supporting a first pivotable engagement member having an end portion extending beyond said planar outside surface, a generally transversely extending latching shoulder at said end portion, said end portion facing said first container for entering the orifice and inner recess of a corner fitting of said first container and shoulder means on said pivotal member mounted within said body and engageably actuable by a means linearly moveable generally transversely to said pivotable member, for thereafter rotating said first pivotable member around an axis which is parallel to the plane of said first planar outside surface within said recess into a gathering locking engagement with said first shipping container;
    c. said body having a second planar outside surface parallel with and facing away from said first planar outside surface, said body supporting a second pivotable engagement member facing away from said first shipping container to permit a second shipping container to be moved into a position adjacent the first container so the said second pivotable engagement member enters an orifice and inner recess of a corner fitting of the second container, said body having additional means mounted therein for thereafter independently rotating, around an axis which is parallel with said second planar outside surface, said second pivotable member into a gathering locking engagement with said second shipping container, thereby effectively gathering and locking a pair of adjacent shipping containers.

2. The connector of claim 1 wherein each said pivotable engagement member comprises a rotatable chuck.

3. The connector of claim 2 wherein each said pivotable engagement member comprises a latching head on said rotatable chuck.

4. The connector of claim 3 wherein each said pivotable engagement member comprises a latching surface on said latching head.

5. The connector of claim 4 wherein each said rotatable chuck includes a cam surface on said chuck distant from said latching head and captive within said body.

6. The connector of claim 5 which includes a rectilinear drive means for interacting with each said cam surface to position said latching surface in a latching position.

7. The connector of claim 6 wherein said body comprises two substantially identical body members.

8. The connector of claim 7 wherein said rectilinear drive means comprises a cylindrical drive rod.

9. The connector of claim 7 wherein said rectilinear drive means comprises a threaded stud.

10. The connector of claim 9 wherein said threaded stud is swivelly connected to a push block having a driving-end in mating engagement with said cam surface.

11. The connector of claim 10 wherein said push block is mounted for sliding reciprocation in a linear channel wider than said push block.

12. The connector of claim 11 wherein the said mating engagement of said driving-end with said cam surface is such that movement of said push block in the direction opposite to the direction for latching initiates unlatching of said latching surface.

* * * * *